(12) United States Patent
Park et al.

(10) Patent No.: US 8,810,761 B2
(45) Date of Patent: Aug. 19, 2014

(54) LIQUID CRYSTAL DISPLAY

(75) Inventors: Jae Hong Park, Seoul (KR); Sung-Jae Yun, Hwaseong-si (KR); Jae-Soo Jang, Suwon-si (KR); Jun Ha Park, Anyang-si (KR); Jeong Ho Lee, Seoul (KR); Hyeok Jin Lee, Seongnam-si (KR); Sung Hwan Hong, Suwon-si (KR); Oh Jeong Kwon, Hwaseong-si (KR); Jae-Hoon Kim, Seoul (KR); Kwang-Soo Bae, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 198 days.

(21) Appl. No.: 13/460,667

(22) Filed: Apr. 30, 2012

(65) Prior Publication Data

US 2012/0281172 A1    Nov. 8, 2012

Related U.S. Application Data

(60) Provisional application No. 61/481,546, filed on May 2, 2011.

(30) Foreign Application Priority Data

May 19, 2011    (KR) .......................... 10-2011-0047435

(51) Int. Cl.
*G02F 1/1337*    (2006.01)
*G02F 1/1343*    (2006.01)

(52) U.S. Cl.
CPC .... *G02F 1/133707* (2013.01); *G02F 1/133753* (2013.01); *G02F 2001/134345* (2013.01)
USPC ............................ 349/129; 349/130; 349/139

(58) Field of Classification Search
CPC ... G02F 1/1343; G02F 1/13; G02F 1/133707; G02F 1/133753; G02F 2001/134345
USPC .......................... 349/141, 123, 129, 130, 139
See application file for complete search history.

(56) References Cited

U.S. PATENT DOCUMENTS

| 5,309,264 | A | 5/1994 | Lien et al. |
| 5,666,179 | A | 9/1997 | Koma |
| 5,710,611 | A | 1/1998 | Suzuki et al. |
| 6,342,938 | B1 | 1/2002 | Song et al. |
| 6,469,764 | B1 | 10/2002 | Kim et al. |

(Continued)

FOREIGN PATENT DOCUMENTS

| JP | 06-043461 | 2/1994 |
| JP | 06-301036 | 10/1994 |

(Continued)

*Primary Examiner* — Lucy Chien
(74) *Attorney, Agent, or Firm* — H.C. Park & Associates, PLC

(57) ABSTRACT

A liquid crystal display according to an exemplary embodiment of the present invention includes: a first substrate; a pixel electrode disposed on the first substrate; a first alignment layer disposed on the first substrate and the pixel electrode; a second substrate facing the first substrate; a common electrode disposed on the second substrate; a second alignment layer disposed on the second substrate and the common electrode; and a liquid crystal layer disposed between the first substrate and the second substrate, wherein the common electrode has a plurality of cutouts having a cross shape, and when viewing the first substrate and the second substrate upward, the edge of the cutout is protruded from the edge of the pixel electrode.

16 Claims, 15 Drawing Sheets

(56) References Cited

U.S. PATENT DOCUMENTS

| | | |
|---|---|---|
| 6,657,693 B1 | 12/2003 | Jeong et al. |
| 6,940,571 B2 | 9/2005 | Ham et al. |
| 7,391,490 B2 | 6/2008 | Nakanishi et al. |
| 7,492,428 B2 | 2/2009 | Lee |
| 7,714,966 B2 | 5/2010 | Ishii |
| 2001/0006408 A1* | 7/2001 | Matsuyama et al. .......... 349/143 |
| 2006/0139541 A1 | 6/2006 | Yamaguchi et al. |
| 2008/0284953 A1 | 11/2008 | Takahashi et al. |
| 2010/0007834 A1* | 1/2010 | Song et al. .................... 349/129 |
| 2010/0283952 A1 | 11/2010 | Hashimoto et al. |

FOREIGN PATENT DOCUMENTS

| | | |
|---|---|---|
| JP | 08-146428 | 6/1996 |
| JP | 11-352490 | 12/1999 |
| JP | 2000-122082 | 4/2000 |
| JP | 2005-173617 | 6/2005 |
| JP | 2006-003830 | 1/2006 |
| JP | 2006-154585 | 6/2006 |
| JP | 2006-184507 | 7/2006 |
| JP | 2006-201451 | 8/2006 |
| JP | 2007-249241 | 9/2007 |
| JP | 2008-287074 | 11/2008 |
| JP | 2009-294320 | 12/2009 |
| JP | 2010-097226 | 4/2010 |
| JP | 2010-276622 | 12/2010 |
| KR | 10-0228604 | 11/1999 |
| KR | 10-0251878 | 4/2000 |
| KR | 100303351 | 7/2001 |
| KR | 100306800 | 8/2001 |
| KR | 100350643 | 8/2002 |
| KR | 100354904 | 9/2002 |
| KR | 100606410 | 7/2006 |
| KR | 100709700 | 4/2007 |
| KR | 100710159 | 4/2007 |
| KR | 100808040 | 2/2008 |
| KR | 100840470 | 6/2008 |
| WO | 2009/037835 | 3/2009 |

* cited by examiner

LIQUID CRYSTAL DISPLAY

CROSS-REFERENCE TO RELATED APPLICATIONS

This application claims priority to and the benefit of Korean Patent Application No. 10-2011-0047435 filed in the Korean Intellectual Property Office on May 19, 2011, and the benefit of U.S. Provisional Patent Application No. 61/481,546, filed on May 2, 2011, which are both hereby incorporated by reference for all purposes as if fully set forth herein.

BACKGROUND

1. Field

Exemplary embodiments of the present invention relate to a liquid crystal display.

2. Discussion of the Background

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

Among the LCDs, a vertical alignment (VA) mode LCD, which aligns LC molecules such that their long axes are perpendicular to the panels in the absence of an electric field, has been developed.

In the VA mode LCD, a wide viewing angle can be realized by cutouts such as minute slits in the field-generating electrodes. Since the cutouts and protrusions can determine the tilt directions of the LC molecules, the tilt directions can be distributed severally by using the cutouts and protrusions such that the reference viewing angle is widened.

In the case providing a plurality of branch electrodes by forming the minute slits in the pixel electrode, an aperture ratio of the liquid crystal display may be decreased.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present invention provide a liquid crystal display reducing a reduction of an aperture ratio while having a wide viewing angle and a fast response speed.

Additional features of the invention will be set forth in the description which follows, and in part will be apparent from the description, or may be learned by practice of the invention.

An exemplary embodiment of the present invention discloses a liquid crystal display including a first substrate, a pixel electrode disposed on the first substrate, a second substrate facing the first substrate, a common electrode disposed on the second substrate, and a liquid crystal layer disposed between the first substrate and the second substrate. The common electrode has a plurality of openings having a cross shape, and when viewing the first substrate and the second substrate upward, the edges of the opening protrude beyond edges of the pixel electrode. At least one of the liquid crystal layer, the first alignment layer, and the second alignment layer includes a photoreactive material.

Liquid crystal molecules of the liquid crystal layer may be arranged substantially vertical to the surface of the first substrate and the second substrate in the absence of an electric field to the liquid crystal layer.

The liquid crystal molecules of the liquid crystal layer may be arranged in a direction parallel to the direction from a position where the edges of the pixel electrode meet toward a center portion of the cutout of the common electrode to have a pretilt.

The pixel electrode may be divided into a plurality of sub-regions by the edges of the pixel electrode and the cutout of the common electrode, in the sub-region; and the liquid crystal molecules of the liquid crystal layer are arranged to have the pretilt of a different direction.

When viewing the first substrate and the second substrate upward, the sub-regions may be symmetrical to each other.

The pixel electrode has at least one cutout formed at a position where two edges of the pixel electrode meet, and the cutout extends from the position where two edges of the pixel electrode meet toward the center portion of the cutout of the common electrode.

The width of the pixel electrode may be gradually widened from the edges of the pixel electrode facing each other to the center portion of the pixel electrode.

According to an exemplary embodiment of the present invention, while increasing the viewing angle of the liquid crystal display, and the response speed and the visibility, the aperture ratio and the transmittance may be increased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
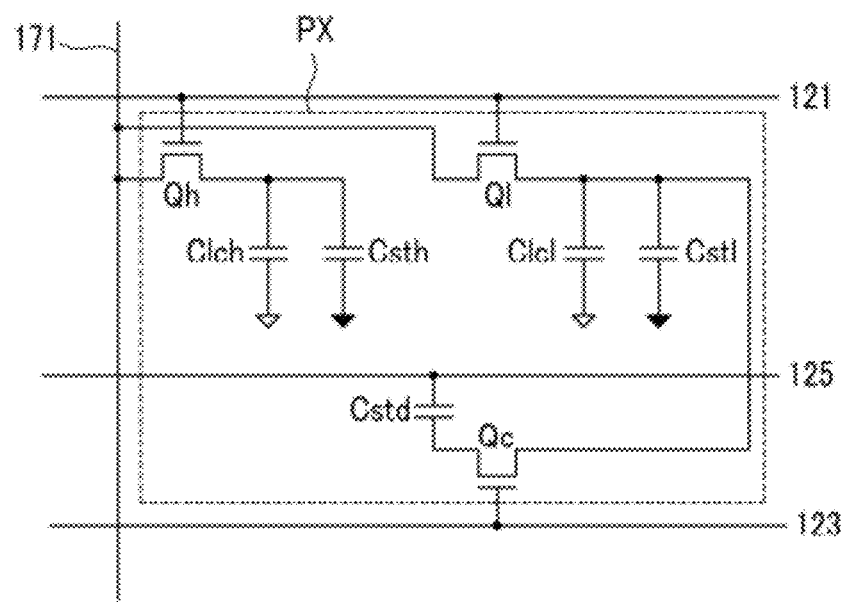
FIG. 1 is an equivalent circuit diagram of one pixel of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal display according to an exemplary embodiment of the present invention will be described with reference to FIG. 1. FIG. 1 is an equivalent circuit diagram of one pixel of a liquid crystal display according to an exemplary embodiment of the present invention.

Referring to FIG. 1, a liquid crystal display according to an exemplary embodiment of the present invention includes signal lines including a gate line 121, a storage electrode line 125, a step-down gate line 123, and a data line 171, and a pixel PX connected to the signal lines. The step-down gate line 123 may be a next gate line or a separate gate line.

The pixel PX includes a first switching element Qh, a second switching element Ql, and a third switching element Qc, first and second liquid crystal capacitors Clch and Clcl, first and second storage capacitors Csth and Cstl, and a step-down capacitor Cstd. Here, the first switching element Qh and the first thin film transistor Qh are denoted by the same reference numeral, the second switching element Ql and the second thin film transistor Ql are denoted by the same reference numeral, and the third switching element Qc and the third thin film transistor Qc are denoted by the same reference numeral.

The first and second thin film transistors Qh and Ql are both connected to the gate line 121 and the data line 171, and the third thin film transistor Qc is connected to the step-down gate line 123.

The first thin film transistor Qh as a three terminal element provided in a lower panel 100 has a control terminal connected to the gate line 121, an input terminal connected to the data line 171, and an output terminal connected to the first liquid crystal capacitor Clch and the first storage capacitor Csth. The second thin film transistor Ql as a three terminal element provided in the lower panel 100 has a control terminal connected to the gate line 121, an input terminal connected to the data line 171, and an output terminal connected to the second liquid crystal capacitor Clcl and the second storage capacitor Cstl.

The third thin film transistor Qc as a three terminal element provided in the lower panel 100 has a control terminal connected to the step-down gate line 123, an input terminal connected to the second liquid crystal capacitor Clcl, and an output terminal connected to the step-down capacitor Cstd.

Figure 2:
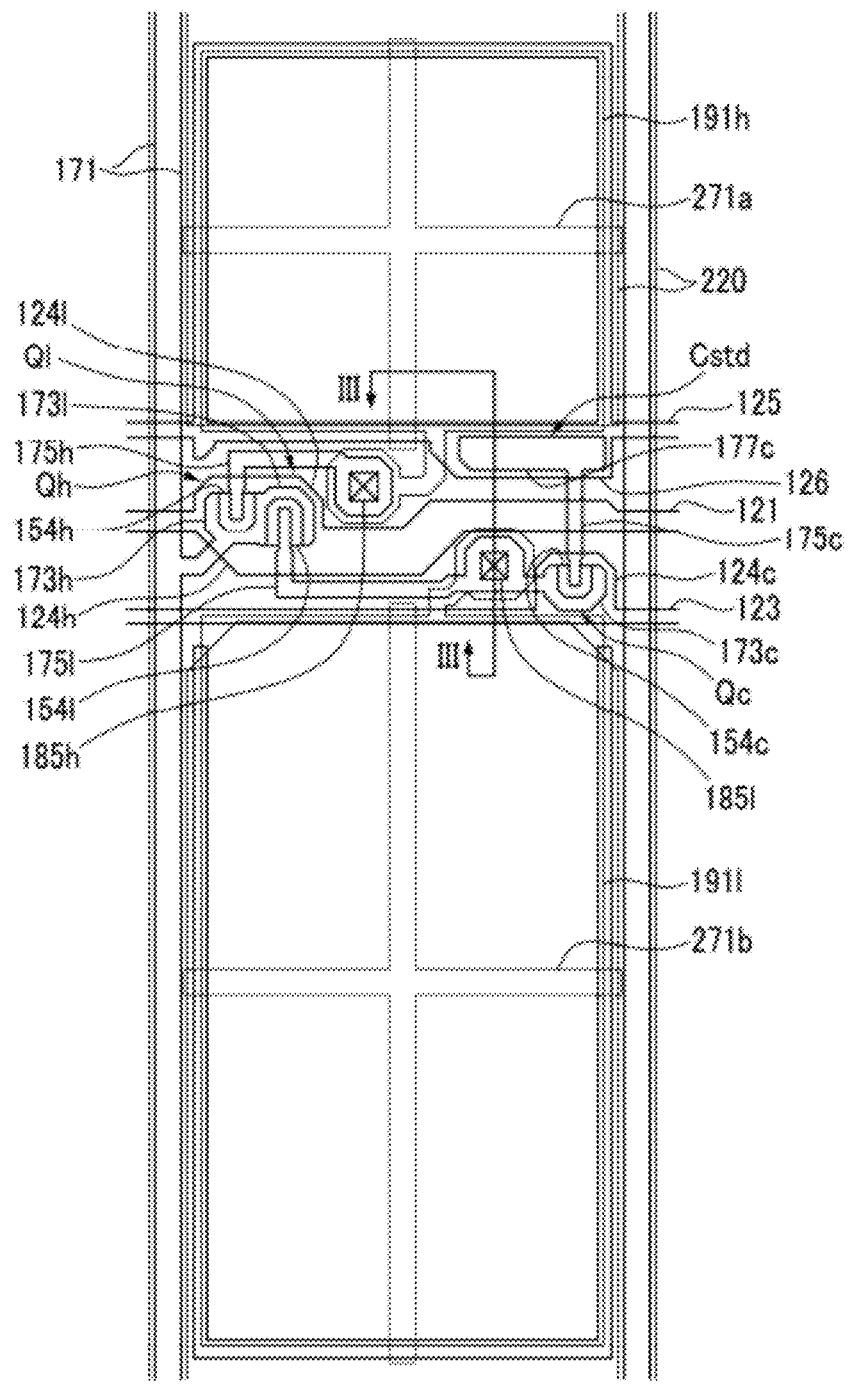
FIG. 2 is a layout view of a liquid crystal display according to an exemplary embodiment of the present invention.

The first and second liquid crystal capacitors Clch and Clcl are formed by overlapping first and second subpixel electrodes 191h and 191l connected to the first and second switching elements Qh and Ql and a common electrode 270 of an upper panel 200 (see FIG. 2). The first and second storage capacitors Csth and Cstl are formed by the storage electrode line 125 as well as a storage electrode overlapping first and second subpixel electrodes 191h and 191l.

The step-down capacitor Cstd is connected to the output terminal of the third thin film transistor Qc and the storage electrode line 125. The storage electrode line 125 is provided in the lower panel 100 (see FIG. 2) and the output terminal of the third thin film transistor Qc overlaps the storage electrode line 125 via an insulator.

A driving method of the liquid crystal display will be described with reference to FIG. 1.

If the gate line 121 is applied with the gate-on signal, the first switching element Qh and the second switching element Ql connected thereto are turned on. Accordingly, the data voltage applied to the data line 171 is applied to the first sub-pixel electrode and the second sub-pixel electrode through the turned on first switching element Qh and second switching element Ql. At this time, the data voltages applied to the first sub-pixel electrode 191h and the second sub-pixel electrode 191l have the same magnitude. Accordingly, the voltages charged to the first and second liquid crystal capacitors Clch and Clcl are the same. Next, if the gate line 121 is applied with the gate-off signal and the step-down gate line 123 is applied with the gate-on signal, the first switching element Qh and the second switching element Ql are turned off and the third switching element Qc is turned on. Thus, the charge is moved from the second sub-pixel electrode 191l to the step-down capacitor Cstd through the third switching element Qc. Thus, the charge voltage of the second liquid crystal capacitor Clcl is decreased and the step-down capacitor Cstd is charged. The charge voltage of the second liquid crystal capacitor Clcl is decreased by the capacitance of the step-down capacitor Cstd such that the charge voltage of the second liquid crystal capacitor Clcl is lower than the charge voltage of the first liquid crystal capacitor Clch.

In this state, charge voltages of two liquid crystal capacitors Clch and Clcl represent the different gamma curves, and the gamma curve of one pixel voltage is a combination curved line of the different gamma curves. The front combination gamma curve coincides with the reference gamma curve at the optimally-determined front side, and the lateral gamma curve approximates the front reference gamma curve. In this way, the image data are converted so that the lateral visibility is improved.

The liquid crystal display shown in FIG. 1 will be described with reference to FIG. 2, FIG. 3, and FIG. 4. FIG. 2 is a layout view of a liquid crystal display according to an exemplary embodiment of the present invention, FIG. 3 is a cross-sectional view of the liquid crystal display of FIG. 2 taken along line III-III, and FIG. 4 is a top plan view of a base region of a field generating electrode of a liquid crystal display according to an exemplary embodiment of the present invention.

Figure 3:
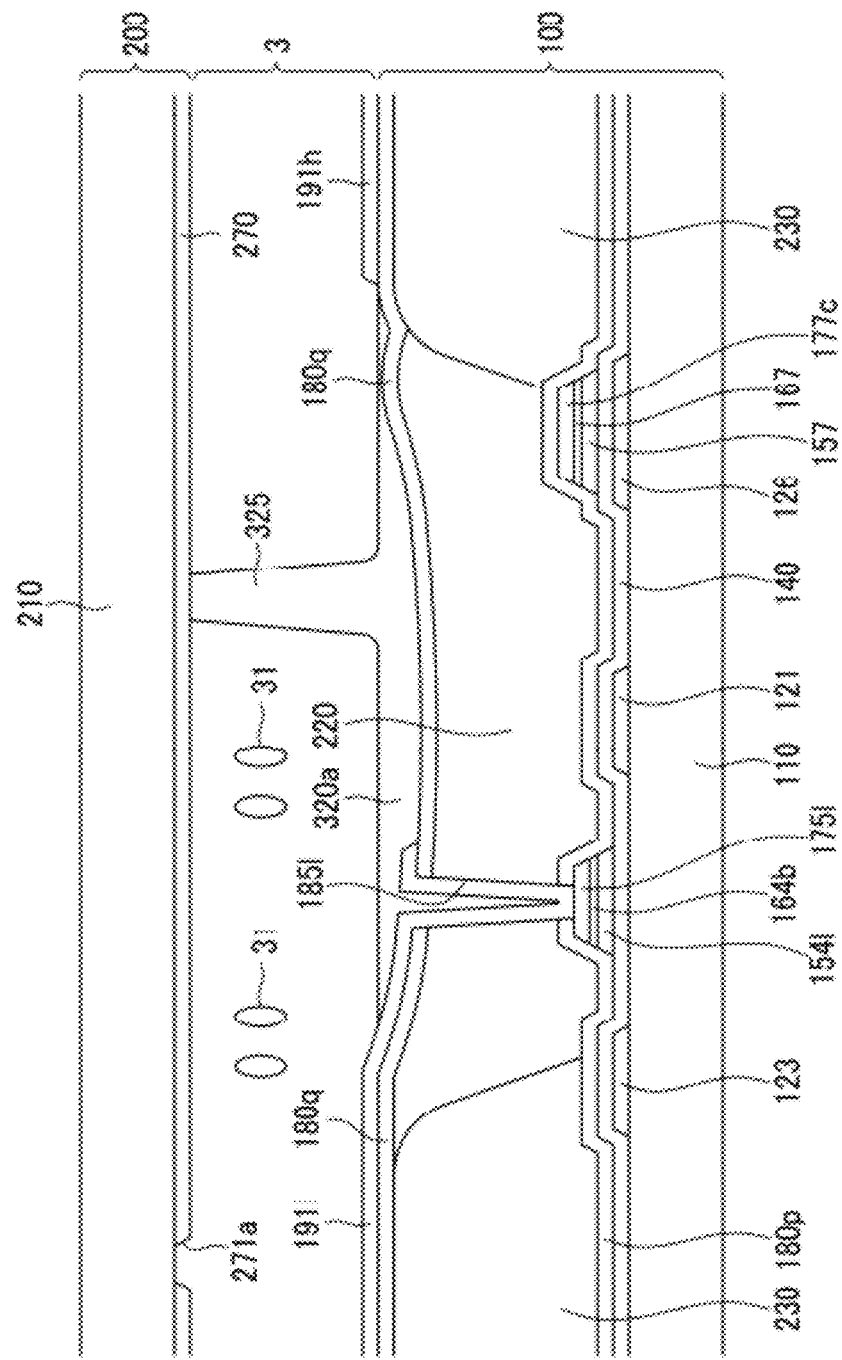
FIG. 3 is a cross-sectional view of the liquid crystal display of FIG. 2 taken along line III-III.
Figure 4:
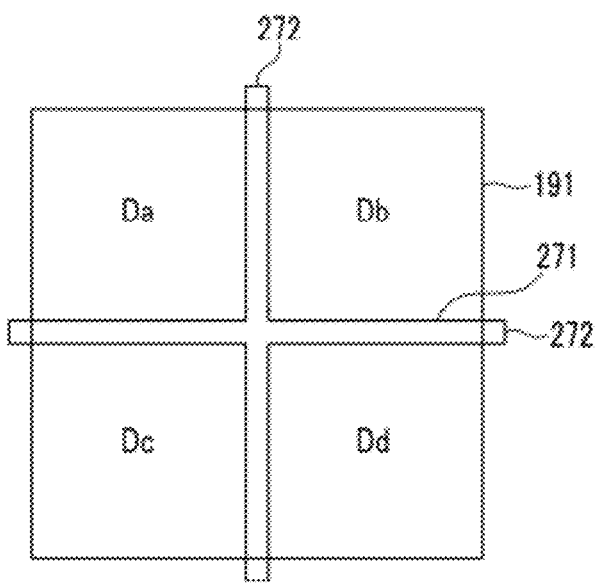
FIG. 4 is a top plan view of a base region of a field generating electrode of a liquid crystal display according to an exemplary embodiment of the present invention.

Referring to FIG. 2 and FIG. 3, the liquid crystal display according to the present exemplary embodiment includes the lower panel 100 and the upper panel 200 facing each other, a liquid crystal layer 3 interposed between the two display panels 100 and 200, and a pair of polarizers (not shown) attached at the outer surfaces of the display panels 100 and 200.

Now, the lower panel 100 will be described.

A plurality of gate conductors including a plurality of gate lines 121, a plurality of step-down gate lines 123, and a plurality of storage electrode lines 125 are formed on an insulation substrate 110.

The gate lines 121 and the step-down gate lines 123 transfer gate signals and mainly extend in a transverse direction. Each gate line 121 includes a first gate electrode 124h and a second gate electrode 124l protruding upward and downward, and each step-down gate line 123 includes a third gate electrode 124c protruding upward. The first gate electrode 124h and the second gate electrode 124l are connected to each other, thereby forming one protrusion.

The storage electrode lines 125 are mainly extended in the transverse direction, and transfer a predetermined voltage such as a common voltage Vcom. Each storage electrode line 125 includes a storage electrode (not shown) protruding upward and downward, a pair of longitudinal portions (not shown) extending almost perpendicularly to the gate line 121 downward, and a transverse portion (not shown) connecting the ends of a pair of longitudinal portions to each other. The transverse portion includes a storage expansion 126 extended downward.

A gate insulating layer 140 is formed on the gate conductors 121, 123, and 125.

A plurality of semiconductors stripes (not shown) made of hydrogenated amorphous silicon (a-Si), polysilicon, or so on are formed on the gate insulating layer 140. The semiconductors are mainly extended in the vertical direction, and each semiconductor includes first and second semiconductors 154h and 154l extending toward the first and second gate electrodes 124h and 124l and connected to each other, and a third semiconductor 154c connected to the second semiconductor 154l. The third semiconductor 154c is extended, thereby forming a fourth semiconductor 157.

A plurality of ohmic contact stripes (not shown) are formed on the semiconductor stripes, wherein first ohmic contacts (not shown) are formed on the first semiconductor 154h, and a second ohmic contact 164b and a third ohmic contact (not shown) are also formed on the second semiconductor 154l and the third semiconductor 154c. The ohmic contact stripes include a first protrusion (not shown) forming a pair along with a first ohmic contact island and disposed on a first protrusion of the semiconductor, a second protrusion (not shown) forming a pair along with a second ohmic contact island and disposed on a second protrusion of the semiconductor, and a third protrusion (not shown) forming a pair along with a third ohmic contact island and disposed on a third protrusion of the semiconductor. The third ohmic contact is extended, thereby forming a fourth ohmic contact 167.

A data conductor is formed on the ohmic contacts. The data conductor includes a plurality of data lines 171, a plurality of first drain electrodes 175h, a plurality of second drain electrodes 175l, and a plurality of third drain electrodes 175c.

The data lines 171 transmit data signals and extend in the longitudinal direction thereby crossing the gate lines 121 and the step-down gate lines 123. Each data line 171 includes a first source electrode 173h and a second source electrode 173l forming a "W" shape together and extending toward a first gate electrode 124h and a second gate electrode 124l.

The first drain electrode 175h, the second drain electrode 175l, and the third drain electrode 175c have one end portion having a wide area and the other end portion of a linear shape. The bar end portions of the first drain electrode 175h and the second drain electrode 175l are partially enclosed by the first source electrode 173h and the second source electrode 173l. The wide end portion of the second drain electrode 175l is again extended thereby forming a third source electrode 173c of a "U" shape. An expansion 177c of the third drain electrode 175c overlaps the storage expansion 126 thereby forming a step-down capacitor Cstd, and the bar end portion of the third drain electrode 175c is partially enclosed by the third source electrode 173c.

The first gate electrode 124h, the first source electrode 173h, and the first drain electrode 175h form a first thin film transistor (TFT) Qh along with the first semiconductor island 154h, and a channel of the first thin film transistor Qh is formed in the first semiconductor 154h between the first source electrode 173h and the first drain electrode 175h.

The second gate electrode 124l, the second source electrode 173l, and the second drain electrode 175l form a second thin film transistor (TFT) Ql along with the second semiconductor island 154l, and a channel of the second thin film transistor Ql is formed in the second semiconductor 154l between the second source electrode 173l and the second drain electrode 175l.

The third gate electrode 124c, the third source electrode 173c, and the third drain electrode 175c form a third thin film transistor (TFT) Qc along with the third semiconductor island 154c, and a channel of the third thin film transistor Qc is formed in the third semiconductor 154c between the third source electrode 173c and the third drain electrode 175c.

Also, the semiconductor stripes including the semiconductors 154h, 154l, and 154c except for the channel region between the source electrodes 173h, 173l, and 173c, and the drain electrodes 175h, 175l, and 175c have substantially the same shape as the data conductors 171, 175h, 175l, and 175c and the ohmic contacts 164b and 167. That is, the semiconductor stripes including the semiconductors 154h, 154l, and 154c have a portion that is exposed without being covered by the data conductors 171, 175h, 175l, and 175c, between the source electrodes 173h, 173l, and 173c and the drain electrodes 175h, 175l, and 175c.

A lower passivation layer 180p made of an inorganic insulator such as silicon nitride or silicon oxide is formed on the data conductors 171, 175h, 175l, 175c and the exposed semiconductors 154h, 154l, and 154c.

A color filter 230 is formed on the lower passivation layer 180p. The color filter 230 is formed in most of the region except for where the first thin film transistor Qh, the second thin film transistor Ql, and the third thin film transistor Qc are positioned. Also, each color filter 230 may be formed long in a space in the longitudinal direction between the neighboring data lines 171. Each color filter 230 may display one of primary colors such as three primary colors of red, green, and blue.

A light blocking member 220 is formed on a region that the color filter 230 does not occupy and on a portion of the color filter 230. The light blocking member 220 is referred to as a black matrix, and prevents light leakage. The light blocking member 220 is extended upward and downward along the gate line 121 and the step-down gate line 123, includes a first light blocking member (not shown) covering a region where the first thin film transistor Qh, the second thin film transistor Ql, and the third thin film transistor Qc are disposed, and a second light blocking member (not shown) extending along the data line 171. The height of the portion of the light blocking member 220 may be lower than the height of the color filter 230.

On the color filter 230 and light blocking member 220, an upper passivation layer 180q is formed. The upper passivation layer 180q prevents peeling of the color filter 230 and the light blocking member 220, and suppresses contamination of the liquid crystal layer 3 by an organic material of the solvent that inflows from the color filter 230, so that it prevents defects such as afterimages that may occur when an image is driven.

On the lower passivation layer 180p, the light blocking member 220, and the upper passivation layer 180q, a plurality of first contact holes 185h and a plurality of second contact holes 185l that expose the wide end portions of the first drain electrodes 175h and the wide end portions of the second drain electrodes 175l, respectively, are formed.

On the upper passivation layer 180q, a plurality of pixel electrodes 191 are formed.

Referring to FIG. 2, each pixel electrode 191 includes a first sub-pixel electrode 191h and a second sub-pixel electrode 191l that are separated from each other with two gate lines 121 and 123 therebetween, and disposed above and below the area of the pixel with the center of the gate lines 121 and 123 to be adjacent in a column direction.

The first sub-pixel electrode 191h and the second sub-pixel electrode 191l receive a data voltage through the first contact hole 185h and the second contact hole 185l from the first drain electrode 175h and the second drain electrode 175l, respectively. The first sub-pixel electrode 191h and the second sub-pixel electrode 191l to which the data voltage is applied generate an electric field in conjunction with the common electrode 270 of the common electrode panel 200 to determine a direction of the liquid crystal molecules of the liquid crystal layer 3 between the two electrodes 191 and 270. As described above, according to the determined direction of the liquid crystal molecules, the luminance of light that passes through the liquid crystal layer 3 is changed.

The first sub-pixel electrode 191h and the common electrode 270 form the first liquid crystal capacitor Clch in conjunction with the liquid crystal layer 3 therebetween, and the second sub-pixel electrode 191l and common electrode 270 form the second liquid crystal capacitor Clcl in conjunction with the liquid crystal layer 3 therebetween, so that the applied voltage is maintained even though the first and second thin film transistors Qh and Ql are turned off.

The first and second sub-pixel electrodes 191h and 191l overlap the storage electrode and the storage electrode line 125 to form the first and second storage capacitors Csth and Cstl, and the first and second storage capacitors Csth and Cstl strengthen the voltage maintaining ability of the first and second liquid crystal capacitors Clch and Clcl.

The storage expansion 126 and the expansion 177c of the third drain electrode 175c overlap the gate insulating layer 140 and semiconductor layers 157 and 167 therebetween to form a voltage drop capacitor Cstd. In another exemplary embodiment of the present invention, the semiconductor layers 157 and 167 that are disposed between the storage expansion 126 and the expansion 177c of the third drain electrode 175c that constitute the voltage drop capacitor Cstd may be removed.

A colored member is formed on the upper passivation layer 180q. The colored member is disposed on the light blocking member 220. The colored member includes a first colored member 320a disposed along the first light blocking member extending upward and downward along the gate line 121 and the step-down gate line 123 and covering the region where the first thin film transistor Qh, the second thin film transistor Ql, and the third thin film transistor Qc are positioned and a second colored member (not shown) disposed along the second light blocking member extending along the data line 171.

The first colored member 320a and the second colored member compensate the height difference of the light blocking member 220 and the color filter 230, and thereby the cell interval of the liquid crystal layer disposed on the color filter 230 and the liquid crystal layer disposed on the light blocking member 220 is uniformly controlled and the function of preventing the light leakage of the light blocking member 220 is reinforced. Since the first colored member 320a and the second colored member compensate the height difference of the light blocking member 220 and the color filter 230, the light leakage of the edge portion of the pixel electrode due to inaccurate control of the liquid crystal molecules disposed between the light blocking member 220 and the color filter 230 by the step between the light blocking member 220 and the color filter 230 may be prevented. Also, since the cell gap on the light blocking member 220 is reduced, the average cell gap is reduced, and thereby the entire liquid crystal amount of the liquid crystal display may be reduced.

A lower alignment layer (not shown) is formed on the pixel electrode 191, the exposed upper passivation layer 180q, and the first colored member 320a and the second colored member. The lower alignment layer may be a vertical alignment layer, and may be an alignment layer that is light-aligned by using a light-polymerized material.

Now, the common electrode panel 200 will be described.

A common electrode 270 is formed on an insulation substrate 210. The common electrode 270 includes a plurality of first cutouts (openings) 271a and a plurality of second cutouts 271b.

Each first cutout 271a of the common electrode 270 is disposed at the position corresponding to each first sub-pixel electrode 191h, and each second cutout 271b is disposed at the position corresponding to each second sub-pixel electrode 191l.

In a plan view, the first cutout 271a and the second cutout 271b may each have a cross shape, and the edge thereof is protruded from the corresponding edge of the first sub-pixel electrode 191h and the second sub-pixel electrode 191l. As described above, by protruding the edge of the cutout of the common electrode 270 from the edge of the pixel electrode, the influence of the fringe field stably affects to the edge of the pixel area, and thereby the arrangement of the liquid crystal molecules may be controlled in the desired direction in the edge of the pixel area.

By the first cutout 271a and the second cutout 271b, and the edges of the first sub-pixel electrode 191h and the second sub-pixel electrode 191l, the first sub-pixel electrode 191h and the second sub-pixel electrode 191l may be divided into a plurality of sub-regions.

An upper alignment layer (not shown) is formed on the common electrode 270. The upper alignment layer may include the vertical alignment layer, and may be an alignment layer that is light-aligned by using the light-polymerized material.

A polarizer (not shown) may be provided on the outer surface of the two display panels 100 and 200, and the transmissive axes of the two polarizers may be orthogonal to each other and any one transmissive axis parallel to the gate line 121. However, the polarizer may only be disposed at one outer surface of the two display panels 100 and 200.

The liquid crystal layer 3 has negative dielectric anisotropy, and the liquid crystal molecules of the liquid crystal layer 3 may be aligned so that long axes thereof are vertical with respect to the surface of the two display panels 100 and 200 in a state in which there is no electric field. Therefore, the incident light does not pass through the crossed polarizers but is blocked in a state in which there is no electric field. At least one of the liquid crystal layer, the first alignment layer, and the second alignment layer includes a photoreactive material.

As described above, since the first sub-pixel electrode 191h and the second sub-pixel electrode 191l to which the data voltage is applied generate an electric field in conjunction with the common electrode 270 of the common electrode panel 200, the liquid crystal molecules of the liquid crystal layer 3, which are aligned vertically with respect to the surfaces of the two electrodes 191 and 270 in a state in which there is no electric field, lie in a horizontal direction with respect to the surfaces of the two electrodes 191 and 270, and the luminance of light that passes through the liquid crystal layer 3 is changed according to the degree of tilt of the liquid crystal molecules.

According to another exemplary embodiment of the present invention, the liquid crystal display further includes a spacer 325 to maintain the cell gap between the two display panels 100 and 200, and the spacer 325 may be simultaneously formed with the same layer as the first colored member 320a and the second colored member.

The liquid crystal layer 3 interposed between the lower panel 100 and the upper panel 200 includes liquid crystal molecules 31 having negative dielectric anisotropy and a polymer. The liquid crystal molecules 31 are aligned such that the long axes thereof are arranged by the cutouts 271a and 271b of the common electrode and the edges of sub-pixel electrodes 191h and 191l to be parallel to the direction from four portions where the edges extending into the different directions of each sub-pixel electrodes 191h and 191l meet each other (corners) toward the center portion of the openings 271a and 271b of the common electrode 270 of the cross shape with the pretilt by the polymer, and to be vertical with respect to the surface of the two display panels 100 and 200. Accordingly, the first and second subpixels respectively have four sub-regions having different pretilt directions of the liquid crystal molecules 31.

Next, a basic region of the field generating electrode of the liquid crystal display according to an exemplary embodiment of the present invention will be described with reference to FIG. 4.

As shown in FIG. 4, the base region of the field generating electrode is made of an opening 271 of the common electrode 270 and a pixel electrode 191 enclosing the opening 271. When viewing the liquid crystal display from above, the base region defined by the opening 271 of the common electrode 270 and the edges of the pixel electrode 191 may be divided into a plurality of sub-regions Da, Db, Dc, and Dd, and the plurality of sub-regions may be symmetrical to each other with respect to the opening 271 of the common electrode 270.

As described above, the cutout (opening) 271 of the common electrode 270 may have the cross shape in a plan view, and edges 272 of the cutout 271 protrude from the corresponding edges of the pixel electrode 191. The width of the cutout 271 of the common electrode 270 may be about 2 μm to about 10 μm.

Figure 5:
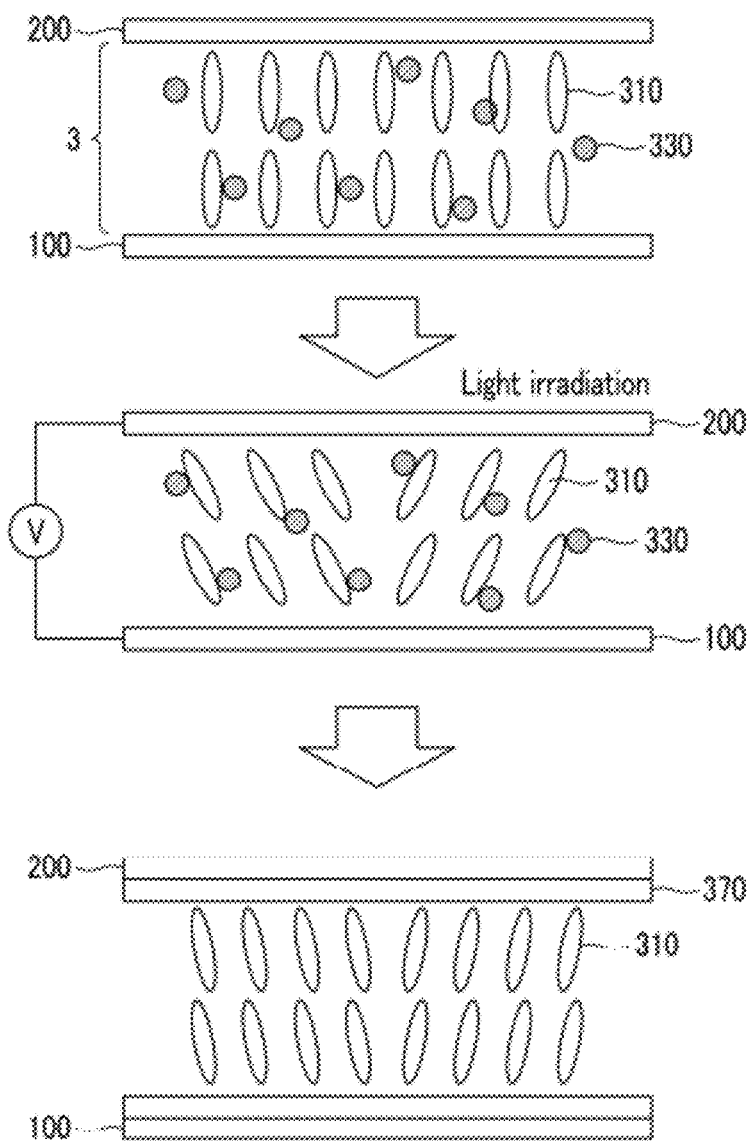
FIG. 5 is a view showing a process of providing a pretilt angle to liquid crystal molecules by using prepolymers that are polarized by light such as ultraviolet rays.
Figure 6:
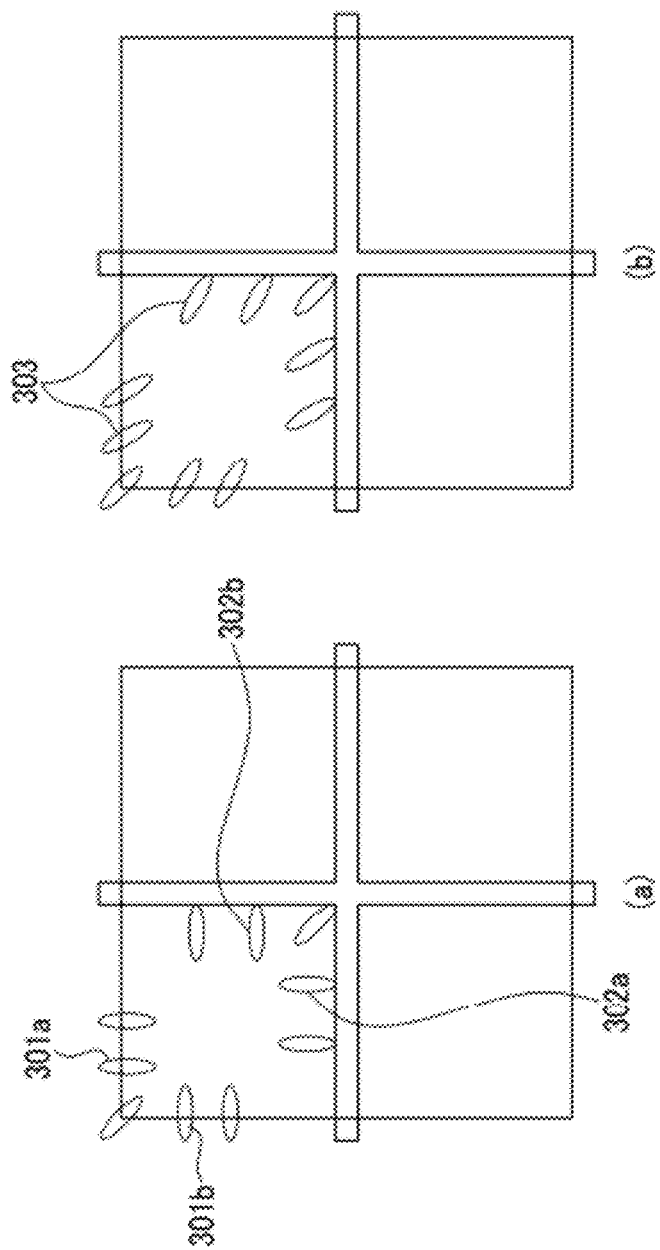
FIG. 6 is a view conceptually showing a liquid crystal direction in a base region of a field generating electrode of a liquid crystal display according to an exemplary embodiment of the present invention.

Next, an initial alignment method providing the pretilt to the liquid crystal molecules of the liquid crystal layer will be described with reference to FIG. 5 and FIG. 6. FIG. 5 is a view showing a process of providing a pretilt angle to liquid crystal molecules by using prepolymers that are polarized by light such as ultraviolet rays, and FIG. 6 is a view conceptually showing a liquid crystal direction in a base region of a field generating electrode of a liquid crystal display according to an exemplary embodiment of the present invention.

Prepolymers 330 such as a monomer that is polymerized by light such as ultraviolet rays are injected along with a liquid crystal material between the two display panels 100 and 200. The prepolymers 330 may be injected into the alignment layers. The prepolymer 330 may be a reactive mesogen that is polymerized by light such as ultraviolet rays.

Next, the data voltage is applied to the first and second subpixel electrodes 191h, 191l and a common voltage is applied to the common electrode 270 of the upper panel 200, thereby forming the electric field in the liquid crystal layer 3 between the two display panels 100 and 200. In response to the applied electric field, the liquid crystal molecules 31 of the liquid crystal layer 3 are tilted in the direction approximately parallel to the direction from four portions where the edges extending in the different directions of pixel electrode 191 meet each other toward the center portion of the opening 271 of the common electrode 270 of the cross shape by the fringe field due to the cutout 271 of the common electrode 270 and the edges of the pixel electrode 191, and thereby the total inclination directions of the liquid crystal molecules 31 is four directions in one base region of the field generating electrode.

This will be described with reference to FIG. 6. Referring to FIG. 6 (a), directors 301a and 301b of the liquid crystal molecules in the portion near the edges of the pixel electrode 191 forming the base region of the field generating electrode are respectively vertical to the edges of the pixel electrode 191. Also, directors 302a and 302b of the liquid crystal molecules in the portion near the cutout 271 of the common electrode forming the base region of the field generating electrode are respectively vertical to the edges of the cutout 271 of the common electrode 270. Like this, the liquid crystal directors according to the fringe field generated by the edges of the pixel electrode 191 forming the base region of the field generating electrode and the cutout 271 of the common electrode are firstly determined and are secondarily arranged in the direction that the liquid crystal molecules meet each other and the deformation is minimized, and the secondary arrangement direction is a vector sum direction of the direction of each director. Accordingly, as shown in FIG. 6 (b), the liquid crystal directors 303 are finally parallel to the direction from four portions where the edges extending in the different directions of the pixel electrode 191 meet each other toward the center portion of the opening 271 of the common electrode 270 of the cross shape. In each sub-region Da, Db, Dc, and Dd, the directors of the liquid crystal molecules 31 according to the fringe field are similarly arranged, and the total directions that the liquid crystal molecules are inclined in each base region of the field generating electrode is four directions. In detail, in the first sub-region of each base region, the directors of the liquid crystal molecules 31 are obliquely arranged in the right lower direction from the edge of the pixel toward the center of the opening 271, in the second sub-region, the directors of the liquid crystal molecules 31 are obliquely arranged in the left lower direction from the edge of the pixel toward the center of the opening 271, in the third sub-region, the directors of the liquid crystal molecules 31 are obliquely arranged in the right upper direction from the edge of the pixel toward the center of the opening 271, and in the fourth sub-region, the directors of the liquid crystal molecules 31 are obliquely arranged in the left upper direction from the edge of the pixel toward the center of the opening 271.

After the electric field is applied to the liquid crystal layer 3, the light such as ultraviolet rays is irradiated, and the prepolymers 330 are polymerized to form polymers 370, as shown in FIG. 5. The polymers 370 are formed while contacting the display panels 100 and 200. By the polymers 370, the alignment direction of the liquid crystal molecules 31 is determined to have the pretilt of the directions as described above. Accordingly, even when the voltage is not applied to the electrodes 191 and 270, the liquid crystal molecules 310 are arranged with the pretilt of the four different directions.

In the liquid crystal display according to the above-described exemplary embodiment, the common electrode 270 has the cutout 271 of one cross shape disposed at the position corresponding to each sub-pixel electrode 191h and 191l, and the base region formed by the sub-pixel electrodes 191h and 191l and the common electrode 270 has four sub-regions, however according to another exemplary embodiment of the present invention, a plurality of openings 271 of a quadrangle ring shape may be formed in one unit pixel and a plurality of base regions of the field generating electrode described with reference to FIG. 4 may be formed in one pixel area.

Figure 7:
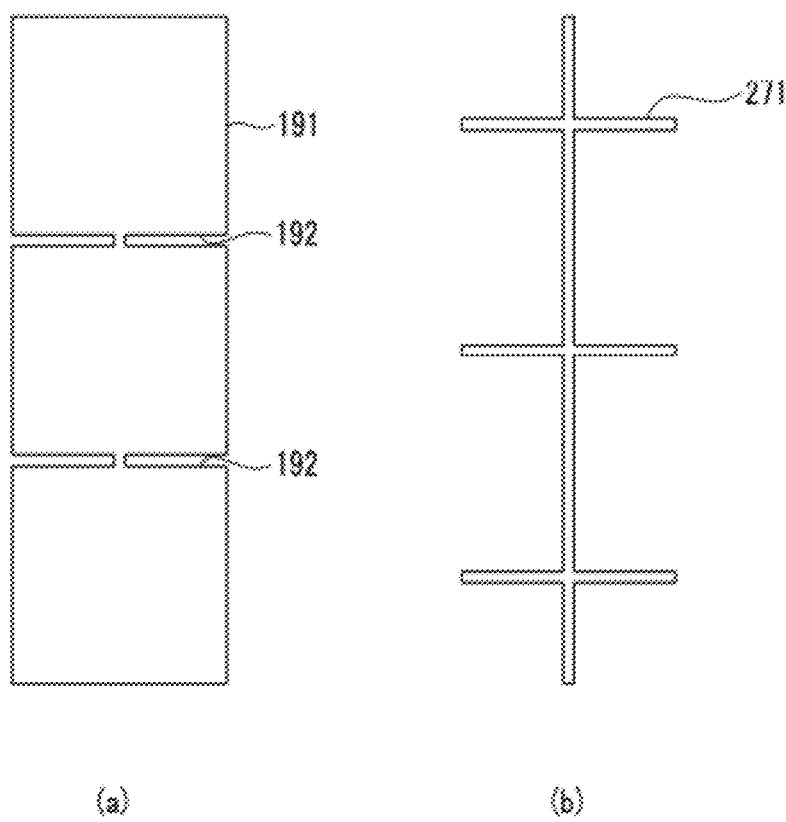
FIG. 7 is a top plan view of one pixel area of a liquid crystal display according to an exemplary embodiment of the present invention.

This will be described with reference to FIG. 7 and FIG. 8. FIG. 7 is a top plan view of one pixel area of a liquid crystal display according to an exemplary embodiment of the present invention, and FIG. 8 is a top plan view of one pixel area of a liquid crystal display according to another exemplary embodiment of the present invention.

Referring to FIG. 7, the cutout 271 of the common electrode 270 corresponding to the pixel electrode 191 disposed in one pixel area has a shape in which three basic cross shapes are combined. Also, the pixel electrode 191 has an edge 192 enclosing the basic cross shape of the cutout 271 of the common electrode 270. Accordingly, in one pixel area, three base regions of the field generating electrode described with reference to FIG. 4 are formed.

Figure 8:
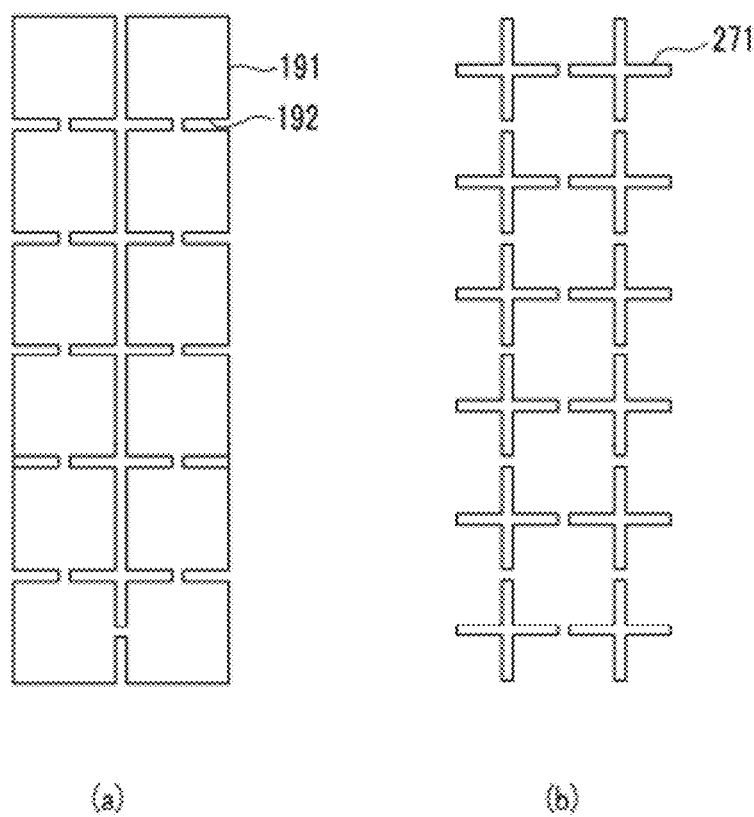
FIG. 8 is a top plan view of one pixel area of a liquid crystal display according to another exemplary embodiment of the present invention.

Referring to FIG. 8, the cutout 271 of the common electrode 270 corresponding to the pixel electrode 191 disposed in one pixel area has a twelve basic cross shape. Also, the pixel electrode 191 has the edge 192 enclosing the basic cross shape of the cutout 271 of each common electrode 270. Accordingly, one pixel area includes twelve base regions of the field generating electrode described with reference to FIG. 4.

As described above, a number of base regions of the field generating electrode formed in each pixel area may be changed according to a size of the pixel or other conditions.

Figure 9:
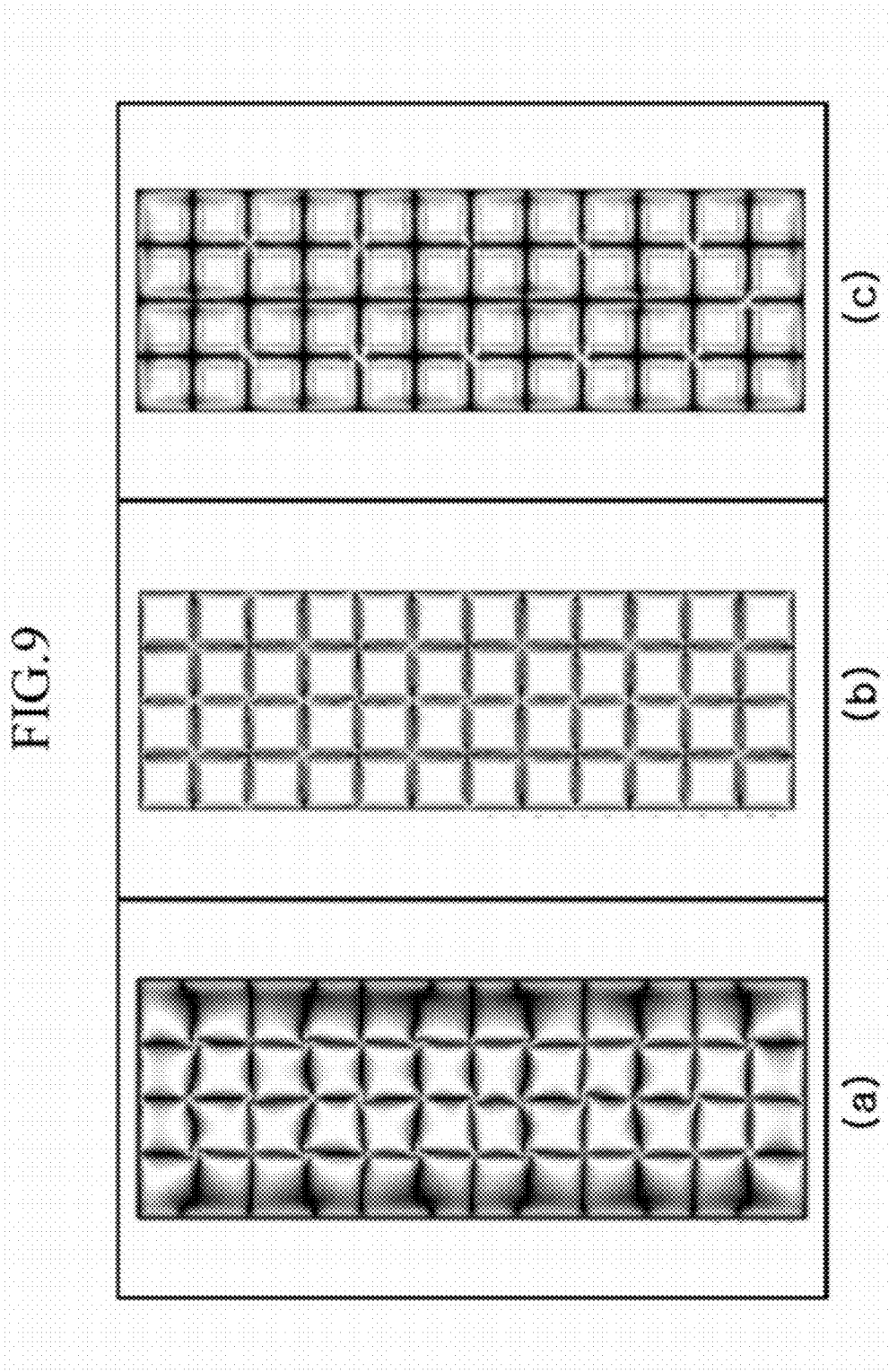
FIG. 9 is a top plan view showing a transmittance result of a liquid crystal display according to one experimental example of the present invention.

Next, referring to FIG. 9, a transmittance result of a liquid crystal display according to one experimental example of the present invention will be described. FIG. 9 is a top plan view showing a transmittance result of a liquid crystal display according to one experimental example of the present invention.

In the present experimental example, as shown in FIG. 8, one pixel area has twelve base regions of the field generating electrode, the width of the cutouts 271 formed in the common electrode and the interval between the edges 192 of the pixel electrode 191 are controlled, and after the voltage of the same magnitude is applied to the pixel electrode 191 and the common electrode 270, the transmittance is simulated. In the present experimental example, referring to FIG. 9, a result when the width of the cutouts 271 formed in the common electrode and the interval between the edges 192 of the pixel electrode 191 are formed at about 3 µm is shown in (a), a result when the width of the cutouts 271 formed in the common electrode and the interval between the edges 192 of the pixel electrode 191 are formed at about 5 µm is shown in (b), and a result when the width of the cutouts 271 formed in the common electrode and the interval between the edges 192 of the pixel electrode 191 are formed at about 10 µm is shown in (c).

Referring to FIG. 9, when the width of the cutout 271 formed in the common electrode and the interval between the edges 192 of the pixel electrode 191 is relatively small, the transmittance at the edge of the base region is decreased, and when the width of the cutout 271 formed in the common electrode and the interval between the edges 192 of the pixel electrode 191 is relatively large, the transmittance of the edge of the pixel area is increased, however the loss of transmittance in the edge portion of the base region is large. Accordingly, when considering the size of the pixel area and other conditions, by controlling the width of the cutout 271 and the interval of the edges 192 between the pixel electrode 191, optimized transmittance may be ensured.

Also, in the case of the liquid crystal display according to an exemplary embodiment of the present invention, compared with a conventional liquid crystal display including the pixel electrode having a plurality of minute branch electrodes formed by a plurality of cutouts in the pixel electrode, the entire cross-section of the pixel electrode is large such that the total transmittance of the liquid crystal display is increased.

Figure 10:
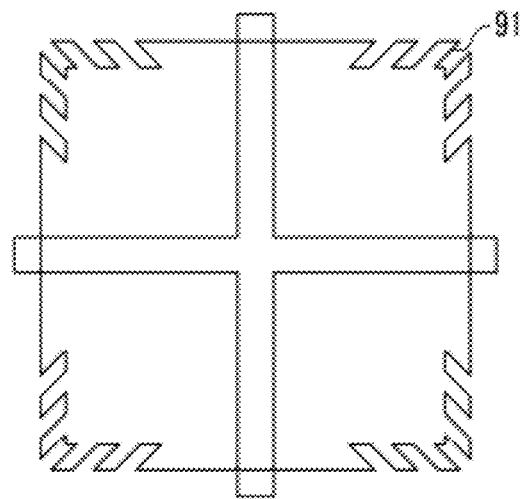
FIG. 10 is a top plan view of a base region of a field generating electrode of a liquid crystal display according to another exemplary embodiment of the present invention.
Figure 12:
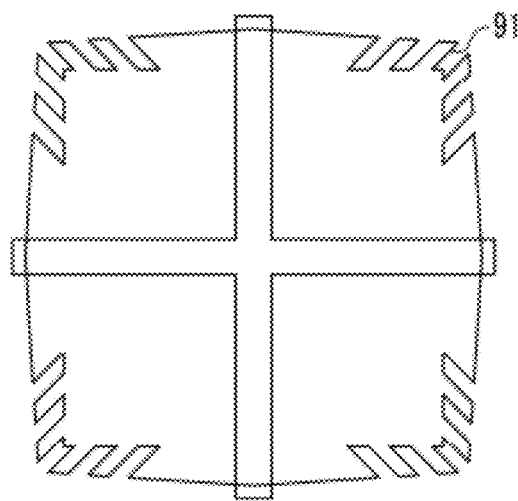
FIG. 12 is a top plan view of a base region of a field generating electrode of a liquid crystal display according to another exemplary embodiment of the present invention.
Figure 13:
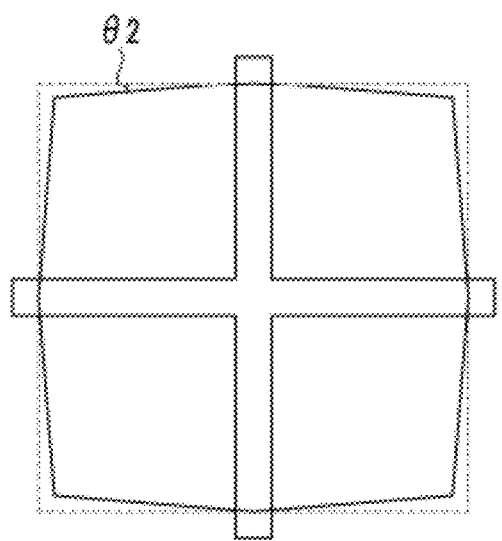
FIG. 13 is a top plan view of a base region of a field generating electrode of a liquid crystal display according to another exemplary embodiment of the present invention.

Next, referring to FIG. 10, FIG. 11, FIG. 12, and FIG. 13, the base region of the field generating electrode of the liquid crystal display according to further exemplary embodiments of the present invention will be described. FIG. 10 is a top plan view of a base region of a field generating electrode of a liquid crystal display according to an exemplary embodiment of the present invention, FIG. 11 is a top plan view of a base region of a field generating electrode of a liquid crystal display according to another exemplary embodiment of the present invention, FIG. 12 is a top plan view of a base region of a field generating electrode of a liquid crystal display according to still another exemplary embodiment of the present invention, and FIG. 13 is a top plan view of a base region of a field generating electrode of a liquid crystal display according to still another exemplary embodiment of the present invention.

Referring to FIG. 10, in the case of the base region of the field generating electrode of the liquid crystal display according to the present exemplary embodiment, in the direction parallel to the direction from each portion that the edges of the pixel electrode extending in the different directions meet each other toward the center of the base region of the field generating electrode, a plurality of cutouts (openings) 91 are formed in the pixel electrode 191. The plurality of cutouts 91 of the pixel electrode 191 strongly guide the arrangement direction of the directors of the liquid crystal molecule. Accordingly, the arrangement of the liquid crystal directors in the edges of the base region of the field generating electrode may be induced in the desired direction. That is, the arrangement of the liquid crystal directors may be induced in the direction from each portion where the edges of the pixel electrode extending in the different directions meet each other toward the center of the base region of the field generating electrode.

Figure 11:
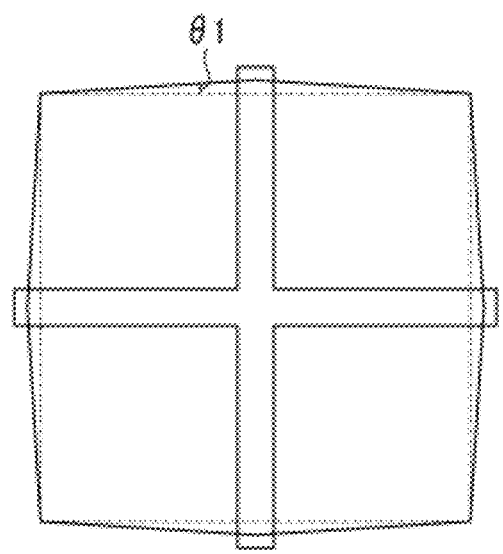
FIG. 11 is a top plan view of a base region of a field generating electrode of a liquid crystal display according to another exemplary embodiment of the present invention.

Referring to FIG. 11, in the case of the base region of the field generating electrode of the liquid crystal display of the present exemplary embodiment, the edges of the pixel electrode are gradually widened closer to the center of the pixel electrode from the portion where the edges extending in the different directions meet each other, and in detail, the width of the pixel electrode is formed to be expanded with a first angle θ1 from both edges facing each other of the pixel electrode to the center portion of the pixel electrode. Accordingly, the arrangement of the liquid crystal directors in the edges of the pixel area may be induced in the desired direction.

In this way, by inclining the edges of the pixel electrode 191 with the predetermined angle θ1 in each sub-region, with reference to a plane surface, the arrangement direction of the liquid crystal directors in the edges of the pixel electrode 191 may also be induced to be toward the direction that the liquid crystal directors are finally inclined. Accordingly, the arrangement of the liquid crystal directors in the edges of the pixel area may be induced in the desired direction. That is, the arrangement of the liquid crystal directors may be induced in the direction from the portion where the edges of the pixel electrode extending in the different directions meet each other toward the center portion of the base region of the field generating electrode.

Next, referring to FIG. 12, in the case of the base region of the field generating electrode of the liquid crystal display of the present exemplary embodiment, like the exemplary embodiment of FIG. 10, in the direction parallel to the direction from each portion where the edges of the pixel electrode extending in the different directions meet each other toward the center portion of the base region of the field generating electrode, a plurality of cutouts 91 are formed in the pixel electrode 191, and simultaneously the edges of the pixel electrode are gradually widened closer to the center of the pixel electrode from the portion where the edges extending in the different directions meet each other, and in detail, the width of the pixel electrode is formed to be expanded with the first angle θ1 from both edges facing each other of the pixel electrode to the center portion of the pixel electrode. Accordingly, the arrangement of the liquid crystal directors in the edges of the pixel area may be induced in the desired direction.

Referring to FIG. 13, in the case of the base region of the field generating electrode of the liquid crystal display of the present exemplary embodiment, the edges of the pixel electrode are gradually narrowed closer to the portion where the edges extending in the different directions meet each other from the center of the pixel electrode, and in detail, the width of the pixel electrode is formed to be decreased with a second angle θ2 from the center of the pixel to the end of the pixel. In this way, by inclining the edges of the pixel electrode 191 with the predetermined angle θ2 in each sub-region, with reference to a plane surface, the arrangement direction of the liquid crystal directors in the edges of the pixel electrode 191 may also be induced to be toward the direction that the liquid crystal directors are finally inclined. Accordingly, the arrangement of the liquid crystal directors in the edges of the pixel area may be induced in the desired direction. That is, the arrangement of the liquid crystal directors may be induced in the direction from the portion where the edges of the pixel electrode extending in the different directions meet each other toward the center portion of the base region of the field generating electrode.

Figure 14:
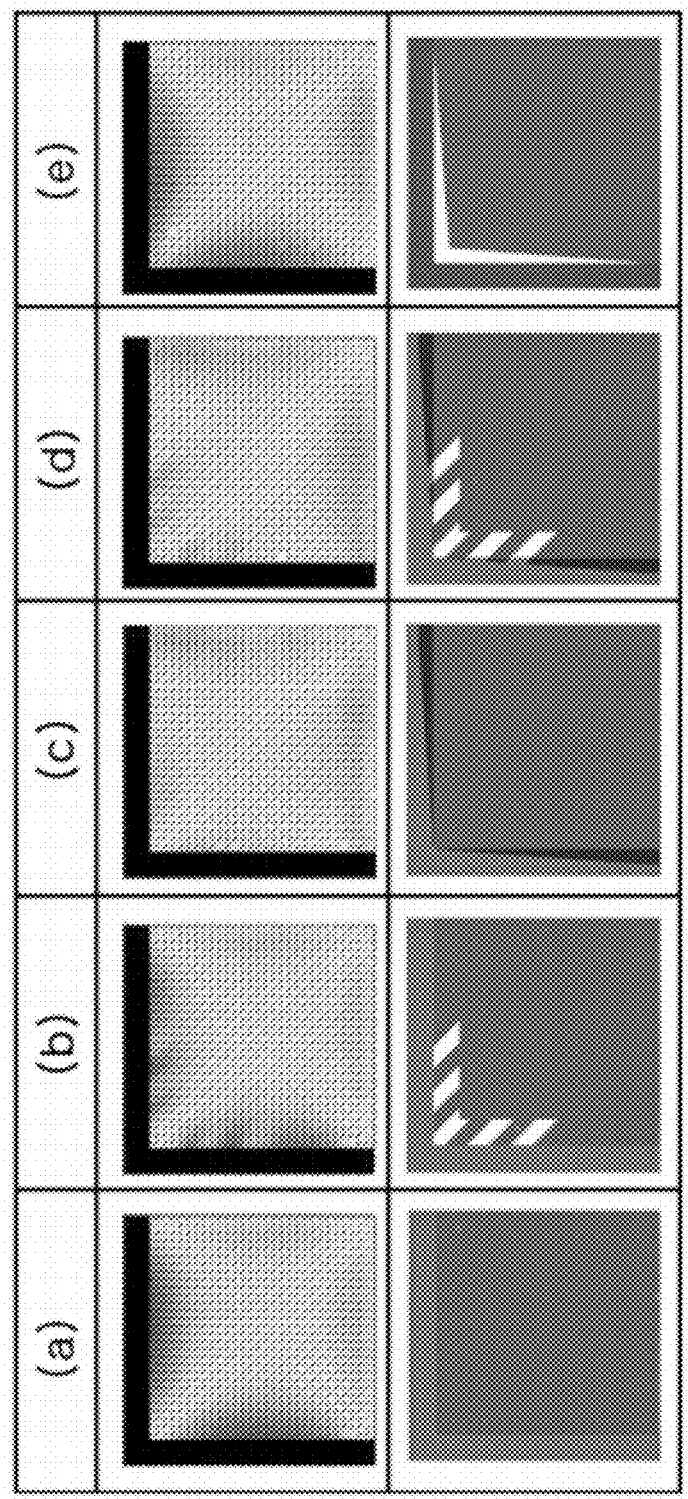
FIG. 14 is a top plan view of an arrangement direction of liquid crystal directors of a liquid crystal display according to another experimental example of the present invention.

Next, referring to FIG. 14, the arrangement direction of the liquid crystal directors of one sub-region of the base region of the liquid crystal display according to another experimental example of the present invention will be described. FIG. 14 is a top plan view of an arrangement direction of liquid crystal directors of a liquid crystal display according to the present experimental example of the present invention. In the present experimental example, a result of one sub-region among the base region of the field generating electrode shown in FIG. 4 is shown in (a), a result of one sub-region among the base region of the field generating electrode shown in FIG. 10 is shown in (b), a result of one sub-region among the base region of the field generating electrode shown in FIG. 11 is shown in (c), a result of one sub-region among the base region of the field generating electrode shown in FIG. 12 is shown in (d), and a result of one sub-region among the base region of the field generating electrode shown in FIG. 13 is shown in (e). In the present experimental example, except for the shape of the base region of the field generating electrode, the remaining conditions are the same.

Referring to FIG. 14, like the liquid crystal display according to the exemplary embodiment shown in FIG. 11 and FIG. 12, when controlling the shape of the base region of the field generating electrode, particularly, the arrangement direction of the liquid crystal directors of the pixel edges accord with the average liquid crystal arrangement direction of the sub-region, and accordingly, the liquid crystal may be easily arranged in the desired direction to have the pretilt.

Figure 15:
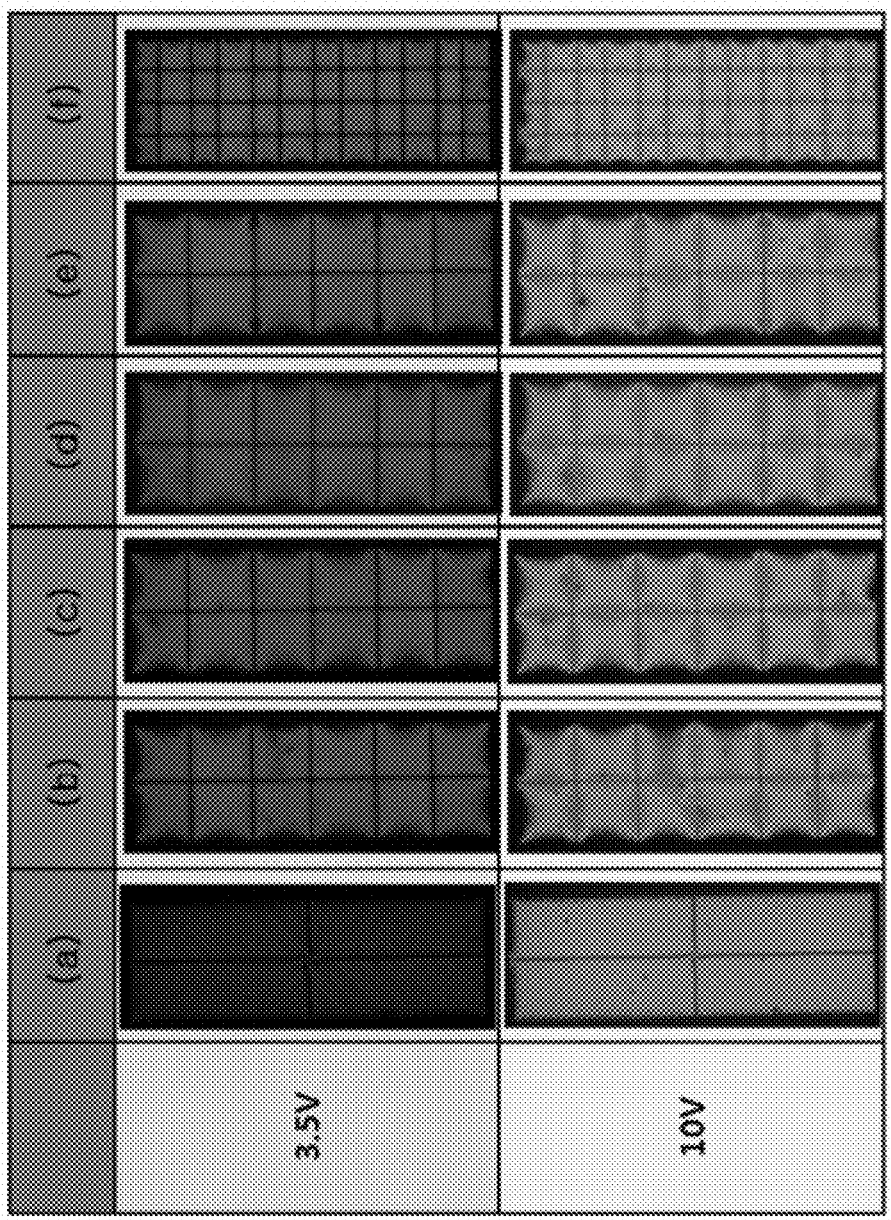
FIG. 15 is a top plan view showing a transmittance result of a liquid crystal display according to another experimental example of the present invention.

Next, referring to FIG. 15, a transmittance result of a liquid crystal display according to one experimental example of the present invention will be described. FIG. 15 is a top plan view showing a transmittance result of a liquid crystal display according to another experimental example of the present invention. In the present experimental example, the shape of the base region of each pixel area is different, and pixels induced with the voltage differences 3.5 V and 10 V between two field generating electrodes 191 and 270 are provided. The conditions except for the shape of the base region of each pixel area are the same. In FIG. 15, like the conventional liquid crystal display, (a) shows a case that the pixel electrode has the shape of a plurality of minute branches. Like the liquid crystal display according to an exemplary embodiment of the present invention, (b) in FIG. 15 shows a case that one pixel area includes three base regions and the widths of the cutout 271 of the common electrode 270 and the interval between the edges 192 of the pixel electrode 191 are about 5 μm, like the liquid crystal display according to an exemplary embodiment of the present invention, (c) shows a case that one pixel area includes three base regions, the widths of the cutout 271 of the common electrode 270 and the interval between the edges 192 of the pixel electrode 191 are about 5 μm, and the edge of the pixel electrode overlaps an opaque member, like the liquid crystal display according to an exemplary embodiment of the present invention, (d) shows a case that one pixel area includes three base regions and the width of the cutout 271 of the common electrode 270 is about 5 μm, the interval between the edges 192 of the pixel electrode 191 is about 5 μm, and the base region shown in FIG. 11 is formed, and like the liquid crystal display according to an exemplary embodiment of the present invention, (e) shows a case that one pixel area includes three base regions, the widths of the cutout 271 of the common electrode 270 and the interval between the edges 192 of the pixel electrode 191 are about 5 μm, and the base region shown in FIG. 10 is formed.

Referring to FIG. 15, comparing the case (a) that the pixel electrode is formed of a plurality of minute branch shapes like the conventional liquid crystal display with the cases (b, c, d, and e) of the liquid crystal displays according to the exemplary embodiments of the present invention, in the case of the liquid crystal display according to the exemplary embodiments of the present invention, the liquid crystal is well aligned according to four sub-regions, and the transmittance is high.

According to exemplary embodiments of the present invention, while increasing the viewing angle of the liquid crystal display, and the response speed and the visibility, the aperture ratio and the transmittance may be increased.

In the case of the liquid crystal display according to the above-described exemplary embodiments, by the edge of the pixel electrode 191 and the cutout 271 of the common electrode 270, the base region of the field generating electrode is divided into a plurality of sub-regions, however in the case of the liquid crystal display according to another exemplary embodiment of the present invention, the common electrode 270 does not include the cutout 271, a chiral dopant is added to the liquid crystal layer 3 of the liquid crystal display, and then a pitch of the chiral dopant is controlled, and light alignment is performed by using a light-polymerized material or polarized ultraviolet rays to divide into the different sub-regions. In the case of the liquid crystal display according to the present exemplary embodiment, disclination of the liquid crystal molecules in the boundary portion of each sub-region may be prevented. The pitch of the liquid crystal according to the chiral dopant may be induced in Gooch and Tarry equation, and in detail it is satisfied with $$u = \frac{\Gamma}{2\phi} = \frac{\pi \Delta n d}{\lambda \phi}, u = \sqrt{3}.$$

Here, ϕ as a twisting angle is (P/d)2π, P is the pitch, and d is the cell gap.

In this way, the cutout is not formed in the field generating electrode, the chiral dopant is added to the liquid crystal layer, and the light alignment is performed, and thereby the multiple domains may be formed without a reduction of the aperture ratio.

Figure 16:
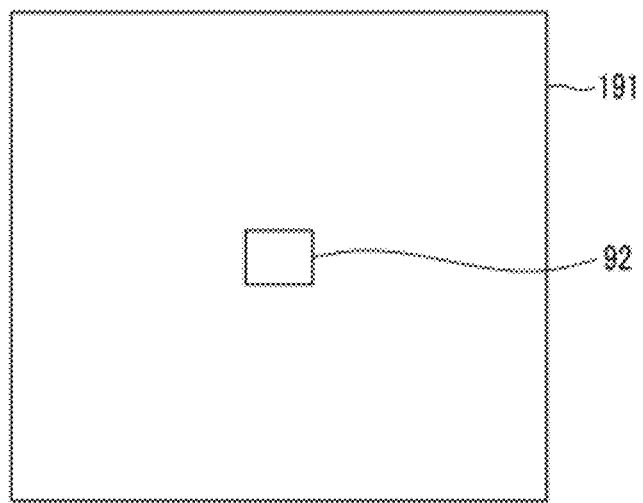
FIG. 16 is a top plan view of a base region of a field generating electrode of a liquid crystal display according to another exemplary embodiment of the present invention.

Next, the liquid crystal display according to another exemplary embodiment of the present invention will be described with reference to FIG. 16. FIG. 16 is a top plan view of a base region of a field generating electrode of a liquid crystal display according to another exemplary embodiment of the present invention.

Referring to FIG. 16, the liquid crystal display according to the present exemplary embodiment includes the pixel electrode 191 having a cutout (opening) 92 formed at the center. The liquid crystal layer of the liquid crystal display according to the present exemplary embodiment includes a chiral dopant, and the liquid crystal according to the chiral dopant may be induced according to the Gooch the Tarry equation, and in detail, $$u = \frac{\Gamma}{2\phi} = \frac{\pi \Delta n d}{\lambda \phi}, u = \sqrt{3}.$$

Here, ϕ as a twisting angle is (P/d)2π, P is the pitch, and d is the cell gap.

Differently from the above-described exemplary embodiment, the pixel electrode 191 has the cutout 92, thereby strongly inducing the plurality of domain divisions.

Figure 17:
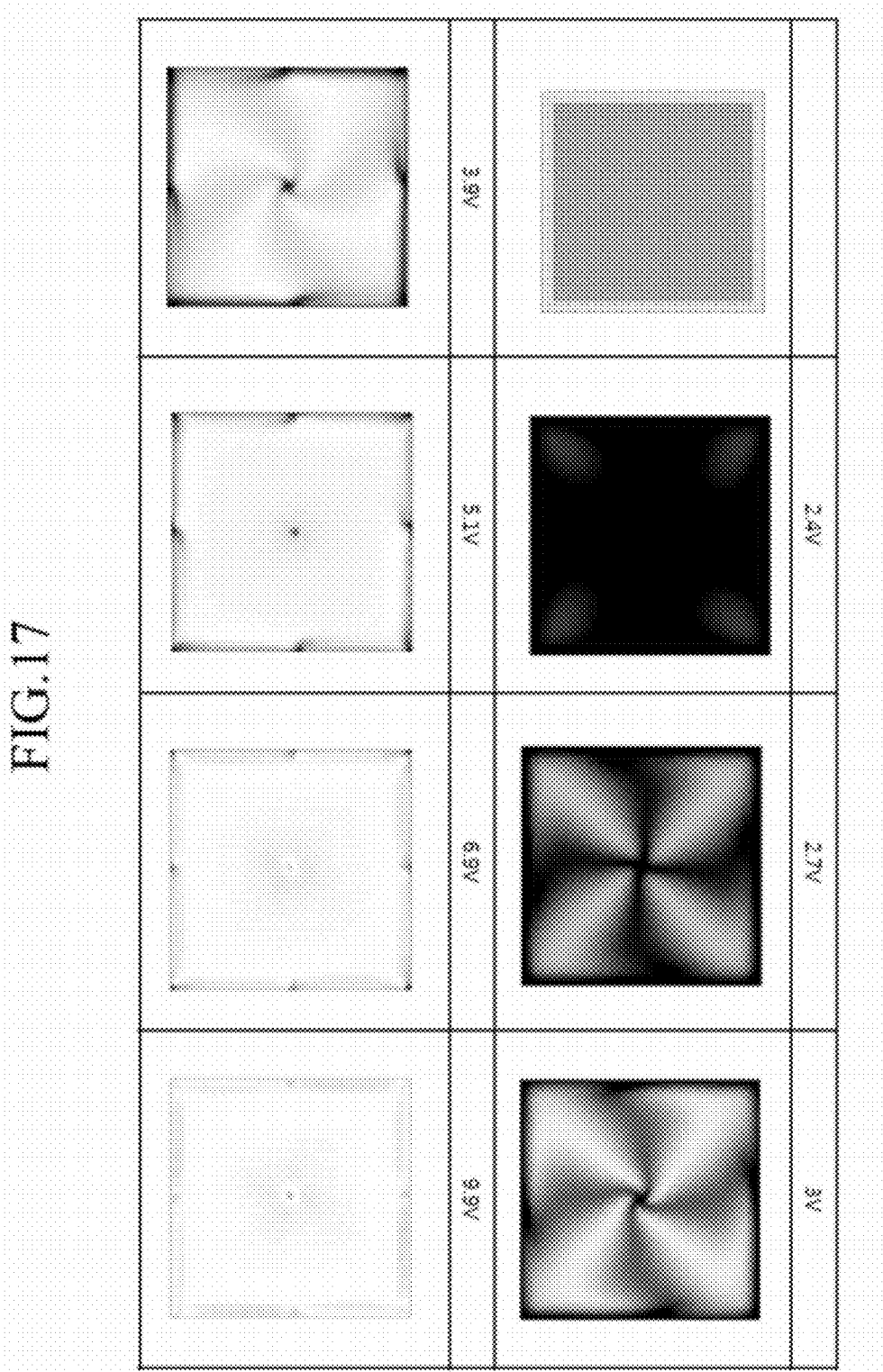
FIG. 17 is a top plan view showing a transmittance result of a liquid crystal display according to another experimental example of the present invention.

Next, a transmittance result of a liquid crystal display according to another experimental example of the present invention will be described with reference to FIG. 17. FIG. 17 is a top plan view showing a transmittance result of a liquid crystal display according to another experimental example of the present invention.

In the present experimental example, the cell gap of the liquid crystal is about 6.04 μm, the pitch of the liquid crystal according to the chiral dopant is about 20.67 μm, and •Δn is about 0.0921.

Referring to FIG. 17, in the case of the liquid crystal display according to the exemplary embodiment shown in FIG. 16, the high transmittance may be obtained without disclination of the liquid crystal in the edge of the base region of the pixel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a pixel electrode disposed on the first substrate and comprising at least one opening;
a second substrate facing the first substrate;
a common electrode disposed on the second substrate; and
a liquid crystal layer disposed between the first substrate and the second substrate,
wherein the common electrode comprises a plurality of openings having a cross shape,
wherein, in plan view, the edges of each opening protrude beyond edges of the pixel electrode, and
wherein the opening of the pixel electrode is formed at a position where two edges of the pixel electrode meet, and the opening extends from the position where two edges of the pixel electrode meet toward the center portion of the opening of the common electrode.

2. The liquid crystal display of claim 1, further comprising:
a first alignment layer disposed on the first substrate and the pixel electrode; and
a second alignment layer disposed on the second substrate and the common electrode,
wherein
at least one of the liquid crystal layer, the first alignment layer, and the second alignment layer comprises a polymerized photoreactive material.

3. The liquid crystal display of claim 2, wherein
liquid crystal molecules of the liquid crystal layer are arranged substantially vertical to the surfaces of the first substrate and the second substrate in the absence of an electric field applied to the liquid crystal layer.

4. The liquid crystal display of claim 3, wherein
the liquid crystal molecules of the liquid crystal layer are arranged in a direction parallel to the direction from a position where two edges of the pixel electrode meet toward a center portion of the opening of the common electrode to have a pretilt.

5. The liquid crystal display of claim 4, wherein
the pixel electrode is divided into a plurality of sub-regions by the edges of the pixel electrode and the cutout of the common electrode, and in each sub-region the liquid crystal molecules of the liquid crystal layer are arranged to have the pretilt of a different direction from the other sub-regions.

6. The liquid crystal display of claim 5, wherein
the width of the pixel electrode gradually widens from the edges of the pixel electrode facing each other to the center portion of the pixel electrode.

7. The liquid crystal display of claim 1, wherein
the liquid crystal molecules of the liquid crystal layer are arranged substantially vertical to the surface of the first substrate and the second substrate in the absence of an electric field applied to the liquid crystal layer.

8. The liquid crystal display of claim 7, wherein
the liquid crystal molecules of the liquid crystal layer are arranged in a direction parallel to a direction from a position where two edges of the pixel electrode meet toward a center portion of the opening of the common electrode to have a pretilt.

9. The liquid crystal display of claim 8, wherein
the pixel electrode is divided into a plurality of sub-regions by the edges of the pixel electrode and the opening of the common electrode, and in each sub-region the liquid crystal molecules of the liquid crystal layer are arranged to have a pretilt of a different direction from the other sub-regions.

10. The liquid crystal display of claim 9, wherein
the width of the pixel electrode gradually widens from the edges of the pixel electrode facing each other to the center portion of the pixel electrode.

11. The liquid crystal display of claim 1, wherein
the liquid crystal molecules of the liquid crystal layer are arranged in the direction parallel to the direction from a position where two edges of the pixel electrode meet toward a center portion of the opening of the common electrode to have a pretilt.

12. The liquid crystal display of claim 11, wherein
the pixel electrode is divided into a plurality of sub-regions by the edges of the pixel electrode and the opening of the common electrode, and in each sub-region the liquid crystal molecules of the liquid crystal layer are arranged to have a pretilt of a different direction from the other sub-regions.

13. The liquid crystal display of claim 12, wherein
the width of the pixel electrode gradually widens from the edges of the pixel electrode facing each other to the center portion of the pixel electrode.

14. The liquid crystal display of claim 1, wherein
the pixel electrode is divided into a plurality of sub-regions by the edges of the pixel electrode and the opening of the common electrode, and in each sub-region the liquid crystal molecules of the liquid crystal layer are arranged to have a pretilt of a different direction from the other sub-regions.

15. The liquid crystal display of claim 14, wherein
the width of the pixel electrode gradually widens from the edges of the pixel electrode facing each other to the center portion of the pixel electrode.

16. The liquid crystal display of claim 15, wherein
the width of the pixel electrode gradually widens from the edges of the pixel electrode facing each other to the center portion of the pixel electrode.

* * * * *

UNITED STATES PATENT AND TRADEMARK OFFICE
CERTIFICATE OF CORRECTION

| | | |
|---|---|---|
| PATENT NO. | : 8,810,761 B2 | Page 1 of 1 |
| APPLICATION NO. | : 13/460667 | |
| DATED | : August 19, 2014 | |
| INVENTOR(S) | : Jae Hong Park et al. | |

It is certified that error appears in the above-identified patent and that said Letters Patent is hereby corrected as shown below:

On the title page

Item (73), the name of the second named Assignee including its city and country code was not listed.

In line 3 of item (73), the name of the second named Assignee including its city and country code should be properly listed as -- IUCF-HYU Industry-University Cooperation Foundation Hanyang University, Seoul (KR) --.

Signed and Sealed this
Seventh Day of June, 2016

Michelle K. Lee
*Director of the United States Patent and Trademark Office*